United States Patent [19]

Deicke

[11] Patent Number: 4,465,942

[45] Date of Patent: Aug. 14, 1984

[54] ELECTRICAL INSTALLATION FOR TRIGGERING SWITCHING FUNCTIONS IN MOTOR VEHICLES

[75] Inventor: Axel Deicke, Baldham, Fed. Rep. of Germany

[73] Assignee: Bayerische Motoren Werke Aktiengesellschaft, Fed. Rep. of Germany

[21] Appl. No.: 426,921

[22] Filed: Sep. 29, 1982

[30] Foreign Application Priority Data

Oct. 1, 1981 [DE] Fed. Rep. of Germany ....... 3139067

[51] Int. Cl.³ .................... H02J 1/00; H02G 3/00; B61G 1/08
[52] U.S. Cl. ........................ 307/9; 307/19; 307/29; 307/31; 307/39; 307/64; 307/125; 340/52 R
[58] Field of Search ............... 307/9, 10 LS, 19, 29, 307/31, 38, 39, 64, 125, 126, 140; 340/52, 52 F, 66

[56] References Cited

U.S. PATENT DOCUMENTS

| 3,696,758 | 10/1972 | Godiney, Jr. | 307/9 X |
| 4,317,364 | 3/1982 | Asano et al. | 340/52 F |
| 4,399,429 | 8/1983 | Laporte | 340/52 F |
| 4,403,292 | 9/1983 | Ejzak et al. | 307/19 X |

Primary Examiner—E. A. Goldberg
Assistant Examiner—Derek Jennings
Attorney, Agent, or Firm—Craig & Burns

[57] ABSTRACT

An electrical installation for triggering switching functions in motor vehicles, with a central unit producing from input signals, coordinated output signals to switch load switches, and a redundancy unit; the input, respectively, output signals are thereby combined into groups of mutually similar switching functions and the redundancy unit is so connected that it prepares or readies for each group an output signal for the switching function which, in comparison with the other switching functions of the corresponding group, possesses the highest priority.

18 Claims, 5 Drawing Figures

ELECTRICAL INSTALLATION FOR TRIGGERING SWITCHING FUNCTIONS IN MOTOR VEHICLES

The present invention relates to an electrical installation for triggering switching functions in motor vehicles with a central unit which produces from input signals, coordinated output signals for the switching of load switches, and with a redundancy unit.

Such types of installations are an increasing significance also in motor vehicles by reason of the increasing use of microprocessors. However, the problem thereby arises to an increased extent that in case of a failure of the central unit containing as a rule microprocessors, the switching functions can no longer be initiated or triggered and the motor vehicle no longer can be used. It is, of course, possible to provide for this case a redundancy unit which processes all input signals in the same manner in parallel to the central unit, properly speaking, and which, in case of need, takes over the function thereof. However, in addition to the considerable expenditure, such an arrangement requires a control unit which selects the "correct" output signal from the output signals of the central and redundancy unit.

It is further known (publication, "Elektronik," 5/1981, page 62) to carry out a function monitoring by a redundancy test. In that case, with two identical components or elements, all terminals are connected directly with each other, and a master-checker operation is carried out. As soon as the two elements no longer agree, the master is instantaneously blocked by the checker and an error signal is produced. Also in this case, this will lead to an undesired failure of the entire central unit.

Furthermore, it is known from the "Introduction into the Microprocessor Technique," Texas Instruments, 1977, Chapter 14, to group several switching functions of a motor vehicle into several areas with one central unit each. Insofar as a central unit fails, the central unit of another area can be caused with the aid of an additional control unit to carry out at least base switching functions of the failed area. Also with this prior art installation, the circuit cost are high.

The present invention is concerned with providing an installation of the aforementioned type, in which a total failure of the switching functions controlled by way of the central unit can be avoided with relatively low circuit expenditures.

The underlying problems are solved according to the present invention in that groups of mutually similar switching functions are formed, and in that for each group an output signal for the switching function which in this group possesses the highest priority, can be applied to the load switch by the redundancy unit.

The redundancy unit makes it possible in case of an error of the central unit to carry out the base switching function of the respective group. At least a limited operation of the motor vehicle is possible therewith. The circuit costs necessary for the redundancy unit are relatively slight since the redundancy unit readies for each group of switching functions, exclusively the output signal for a single switching function and merely an error recognition or a decoding of the input signal of the central unit is necessary for the control of the redundancy unit.

According to one embodiment of the present invention, the redundancy unit always readies its output signal when any one signal of the respective group is present. In contrast thereto, according to another embodiment of the present invention, the redundancy unit operates only when the central unit, with proper operation, triggers the switching functions with the highest priority of the respective group.

In the latter case, it is possible according to one embodiment of the present invention, to always release this output signal of the redundancy unit. In case of proper operation of the central unit, the switching function is thus triggered twice. Since, as explained, the redundancy unit possesses a high reliability by reason of its low complexity, it is thereby even possible to supply the associated input signal exclusively to the redundancy unit and thus to relieve the central unit. With such a distributed logic, the central unit takes over only partial tasks. The processing of the most important switching functions of each group, however, may also take place by appropriate hardware with the aid of the redundancy unit. Also in this case, a failure of the central unit can lead to an only partially limited operation of the motor vehicle.

Of course, it is also possible within the scope of the present invention to release the output signal of the redundancy unit only if the central unit operates improperly, i.e., if errors occur in the central unit. Various possibilities thereby offer themselves according to the present invention.

In a plurality simple manner, this release can take place according to the present invention with the aid of a gate circuit for the output signal of the redundancy unit, which is controlled by the central unit into the opened or conductive condition. This presupposes that an improper or faulty operation of the central unit is recognized.

A simple possibility according to the present invention consists for that purpose of a feedback of at least the output of the central unit which triggers the switching function with the highest priority.

Alternatively thereto, the central unit may also supply an additional output signal which changes in case of an improper or faulty operation.

These and other objects, features and advantages of the present invention will become more apparent from the following description when taken in connection with the accompanying drawing which shows, for purposes of illustration only, several electrical systems for triggering switching functions in motor vehicles by means of a central unit and a redundancy unit, and wherein.

Figure 2:
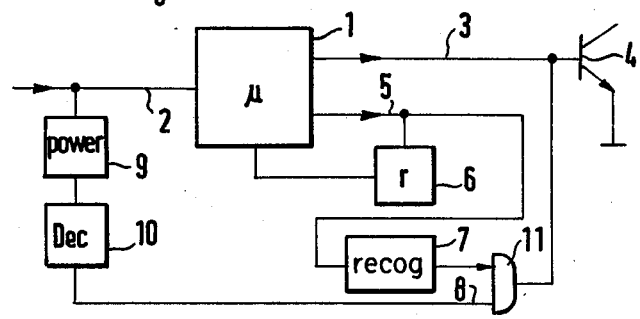
FIG. 2 is a schematic block diagram of a modified embodiment of an electric installation for triggering switching functions in motor vehicles in accordance with the present invention, in which the base switching function can be triggered only in case of a faulty operation of the central unit.
Figure 4:
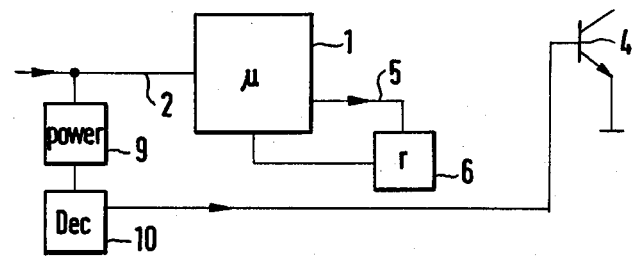
Figure 5:
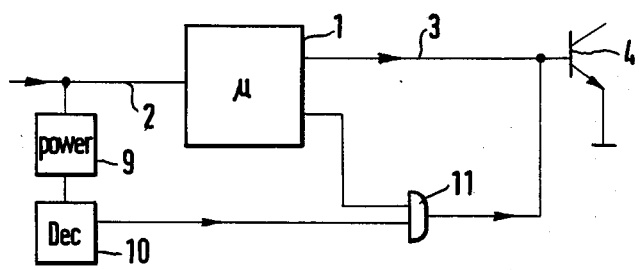

FIG. 4 is a schematic block diagram of a still further modified embodiment of an installation for triggering switching functions in motor vehicles according to the present invention, in which the base switching function can always be triggered only by the redundancy unit; and FIG. 5 is a schematic block diagram of an electrical installation similar to FIG. 2 with an alternative error recognition in accordance with the present invention.

Figure 1:
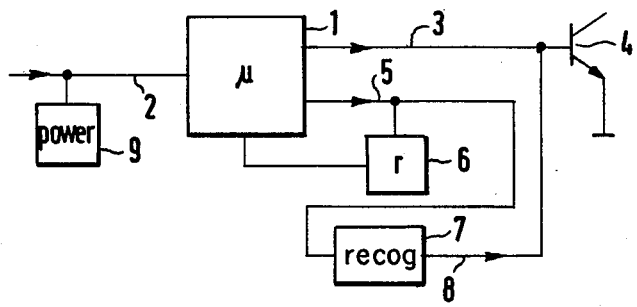
FIG. 1 is a schematic block diagram of an installation for triggering switching functions in motor vehicles according to the present invention, in which a base switching function can be triggered in case of every failure of the central unit.

Referring now to the drawing wherein like reference numerals are used throughout the various views to designate like parts, the electrical installation illustrated in FIG. 1 for triggering switching functions in motor vehicles, includes a central unit 1 in the form of a conventional microprocessor, to which are fed coded input signals by way of the input line 2. The output signals processed in the central unit 1 and corresponding to the input signals, are supplied in coded form by way of one output line 3 or a corresponding output signal is supplied by way of several output lines (not shown). The output signals are fed to a load switch 4 schematically illustrated as transistor. A further output line 5 of the central unit 1 leads, on the one hand, by way of a reset generator 6 back to the central unit 1, and, on the other, to a redundancy unit consisting of an error recognition circuit 7 of any conventional type, whose output 8 is connected to the output line 3.

It is possible with the aid of this circuit to trigger, in case of a failure of the central unit 1, from a group of switching functions, the switching function with the highest priority, i.e., the base switching function. If an input signal exists at the input line 2, then the central unit 1 is turned on by way of a power-hold circuit 9. The reset generator 6 is controlled by way of the output line 5 which resets the central unit 1 in a defined manner. The central unit 1 by reason of a special programming now supplies a rectangular blocking signal also by way of the output line 5 to the error recognition circuit 7 as long as the central unit operates so that the redundancy unit is blocked by such rectangular signal. Simultaneously therewith, during an error-free operation of the central unit 1, the respective output signal is fed to the respective load switch or switches.

In case of a failure of the central unit 1, the rectangular signal for the output line 5 is also interrupted. As a result thereof, the blocking of the redundancy unit which is effected by the rectangular signal, is also lifted. The redundancy unit, in lieu of the central unit 1, now turns-on the load switch 4 belonging to the switching function with the highest priority. This turning-on thus takes place independently of the respective input signal of the central unit 1.

For example, for the group of light-switching functions, the most important switching function, in this case the low beam and parking lights, can be turned on in this manner in case of a failure of the central unit. This function is thereby turned on in case of failure of the central unit 1 independently of whether the input signal is, in fact, the signal for this base function. Prerequisite therefor is only that an input signal from the group of the light switching functions is present at the input of the central unit 1.

The installation according to FIG. 2 corresponds far-reachingly to that of FIG. 1. In contrast to FIG. 1, the triggering of the base switching function in case of a failure of the central unit 1 now takes place only if the input signal belonging to this switching function, in fact, is present at the input of the central unit 1. For that purpose, a decoder 10 is additionally provided which is turned on by the power-hold-circuit 9 and to which the input signals are also fed as to the central unit 1.

The decoder 10 controls a gate circuit 11 in the form of an AND gate to become conductive only in case of the presence of the input signal with highest priority whereby the output 8 of the error recognition circuit 7 is also fed to the gate circuit 11.

If this input signal is present, then the gate circuit 11 makes it possible that the error recognition circuit 7 turns on the load switch 4 for this switching function in case of a failure of the central unit 1. If, in contrast thereto, the input signals for the remaining switching functions are present, then only the central unit 1 can switch the associated load switches. If the central unit 1 indicates an error, this switching function can possibly not be triggered or initiated. With certainty, this triggering does not take place by the error recognition circuit 7 since the gate circuit 11 is blocked.

The installation illustrated in FIG. 2 is purposeful with a further group of switching functions as exist, for example, by the wiper-washing functions of a motor vehicle. The base function is thereby the windshield wiper operation in step 1. This operation is triggered in the presence of the associated input signal by the central unit 1 or, in case of a failure of the central unit, only by the error recognition circuit 7. In the presence of the input signals for the remaining switching functions of this group, for example, washing with subsequent wiping-dry or intermittent wiping with or without incorporation of washing pulses, the turning-on of the associated load switch takes place only with the aid of the central unit 1. Insofar as the central unit 1 does not operate properly, the triggering of these switching functions of lesser significance does not take place.

Figure 3:
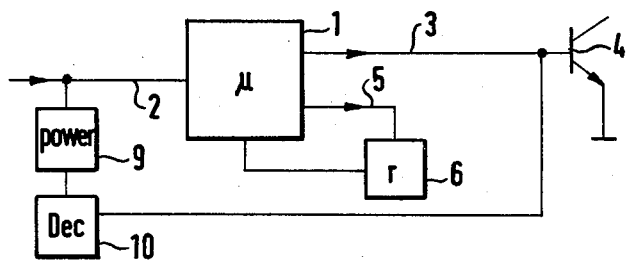
FIG. 3 is a schematic block diagram of a modified embodiment of the electrical installation according to FIG. 2, in which the base switching function is produced independently of a failure of the central unit.

The installation of FIG. 2 can now be enlarged according to FIG. 3 to a parallel processing of the input signals for the base function. FIG. 3 differs from FIG. 2 in that the error recognition circuit 7 and the gate circuit 11 are omitted. The function of the redundancy unit is assumed alone by the decoder 10 whose output signal is fed directly to the output line 3 leading to the load switch for the switching function with the highest priority. The triggering of this switching function thus takes place in case of error-free operation of the central unit 1 both by the latter as also by the decoder 10 whereas in case of an error of the central unit 1, only the decoder 10 enables this switching function. The installation according to FIG. 3 possesses the same reliability as the installation according to FIG. 2 whereby, however, the costs are considerably reduced.

A further reduction of the costs can be attained with the installation according to FIG. 4. In this embodiment, the input signals for all switching functions of a group with the exception of the input signal for the switching function with highest priority are fed to the central unit 1. The input signal for the switching function with the highest priority is utilized exclusively for the triggering of this base switching function with the aid of the decoder 10. The central unit 1 thus assumes only partial tasks. Its failure is thus harmless as the base switching function can be produced in every case with the aid of the decoder 10.

The installation according to FIG. 5 corresponds in its construction far-reachingly to that of FIG. 2. Only with respect to the control of the gate circuit 11 is there a difference in the installation according to FIG. 5. This difference essentially consists in that the central unit 1 is connected directly to the gate circuit 11. For the purpose of control of the central unit 1, the output signal for the switching function with the highest priority is fed back to the input of the central unit 1. Insfar as an error occurs inside of the central unit 1 during the processing of the associated input signal, the gate circuit 11 is opened by the central unit 1 and the switching function with the highest priority is triggered by the decoder 10.

It can be recognized without difficulty from FIGS. 1-5 that the most important switching functions from a respective group of switching functions can be triggered or initiated without difficulty in case of failure of the central unit 1. The output signal for this switching function is or will be readied thereby in connection with the embodiments of FIGS. 1, 2 and 5 but will be triggered only when the central unit operates improperly. In contrast thereto, in the embodiment according to FIG. 3, this output signal is released also when the central unit 1 operates without error. In the embodiment of FIG. 4, finally, it is also assured with a divided logic that notwithstanding an error of the central unit, the switching function with the highest priority can be triggered or initiated.

Since the specific circuits for the various devices illustrated schematically only in block diagram are known as such and form no part of the present invention, a detailed description thereof is dispensed with herein for the sake of simplicity and brevity.

While I have shown and described several embodiments in accordance with the present invention, it is understood that the same is not limited thereto, but is susceptible of numerous changes and modifications as known to those skilled in the art, and I therefore do not wish to be limited to the details shown and described herein but intend to cover all such changes and modifications as are encompassed by the scope of the appended claims.

I claim:

1. An electrical installation for triggering a high priority siwtching function within a group of switching functions in a single motor vehicle comprising
first means forming a central unit producing from input signals coordinated output signals for switching a load switch means, and
redundancy means generating for each group of switching functions an output signal for that switching function which has the highest priority in its corresponding group for actuating the load switch means within said single vehicle.

2. An electrical installation according to claim 1, wherein the output signal of the redundancy unit is operable to be applied to the corresponding load switch means in the presence of any input signal of the respective group.

3. An electrical installation according to claim 1, wherein the output signal of the redundancy unit is operable to be applied to the respective load switch means only in the presence of the corresponding input signal.

4. An electrical installation according to claim 3, wherein the output signal of the redundancy unit is always released.

5. An electrical installation for triggering switching functions in motor vehicles including first means forming a central unit which produces from input signals coordinated output signals for switching load switch means, and second means forming a redundancy unit, operatively connected with said central unit, wherein groups of mutually similar switching functions are formed, and for each group an output signal for the switching function which has the highest priority in a corresponding group, is operable to be fed to the load switch means by the second means forming the redundancy unit,
the output signal of the redundancy unit being operable to be applied to the corresponding load switch means in the presence of any input signal of the respective group, and the output signal of the redundancy unit is released only in case of improper operation of the central unit.

6. An electrical installation according to claim 5, wherein the central unit releases the output signal of the redundancy unit by way of a gate circuit means.

7. An electrical installation according to claim 6, wherein for purposes of testing the central unit, the output signal belonging to the switching function with the highest priority is fed back to the input of the central unit.

8. An electrical installation according to claim 6, wherein the central unit supplies an output signal to the redundancy unit which changes in case of improper operation of the central unit.

9. An electrical installation according to claim 5, wherein for purposes of testing the central unit, the output signal belonging to the switching function with the highest priority is fed back to the input of the central unit.

10. An electrical installation according to claim 5, wherein the central unit supplies an output signal to the redundancy unit which changes in case of improper operation of the central unit.

11. An electrical system for triggering switching functions in a single motor vehicle, comprising central unit means having a microprocessor and for producing from input signals at its input means coordinated output signals at its output means, load switch means for groups of mutually similar switching functions being formed in the system operatively connected with the output means of the central unit means, and redundancy means for applying for each group an output signal for the switching function which in said group has the highest priority to the load switch means within said single motor vehicle.

12. An electrical system for triggering switching functions in motor vehicles, comprising central unit means having a microprocessor and operable to produce from input signals at its input means coordinated output signals at its output means, load switch means operatively connected with the output means of the central unit means, redundancy means, groups of mutually similar switching functions being formed in the system, and further means for applying for each group an output signal for the switching function which in said group has the highest priority, from the redundancy means to the load switch means,
in which a power-hold circuit means turns on the central unit means in the presence of an input signal at its input means.

13. An electrical installation according to claim 12, wherein a reset generator means is connected with an output means of the central unit means, said reset generator means resetting the central unit means in a predetermined manner.

14. An electrical installation according to claim 13, wherein said redundancy means includes an error recognition circuit means which, in case a failure of the central unit, turns on the load switch means belonging to the switching function with highest priority.

15. An electrical installation according to claim 12, 13 or 14, further comprising a decoder means which is controlled by the power-hold circuit means and which is operable only in the presence of the input signal with highest priority to control a gate circuit means, the output of the error recognition circuit means being also applied to said gate circuit means in such a manner that the gate circuit means turns on the load switch means for the switching function with highest priority in case of failure of the central unit.

16. An electrical installation according to claim 15, characterized in that said gate circuit means is an AND gate.

17. An electrical installation according to claim 12, further comprising a decoder means which is controlled by the power hold circuit means, the function of the redundancy means being realized exclusively by the decoder means whose output signal is fed directly to the output means of the central unit means leading to the load switch means for the switching function with the highest priority.

18. An electrical installation according to claim 12, characterized in that a gate circuit means having two inputs is connected directly with one of its inputs to the central unit means and with its other input to a decoder means controlled by the power-hold circuit means, the output of the gate circuit means being connected to the output means of the central unit means leading to the load switch means.

* * * * *